(12) United States Patent
Skrenta et al.

(10) Patent No.: US 8,645,385 B2
(45) Date of Patent: Feb. 4, 2014

(54) SYSTEM AND METHOD FOR AUTOMATING CATEGORIZATION AND AGGREGATION OF CONTENT FROM NETWORK SITES

(75) Inventors: Richard Skrenta, San Carlos, CA (US); Bryn Dole, Sunnyvale, CA (US); Thomas Markson, Palo Alto, CA (US); Robert Truel, Sunnyvale, CA (US)

(73) Assignee: Topix LLC, Palo Alto, CA (US)

( * ) Notice: Subject to any disclaimer, the term of this patent is extended or adjusted under 35 U.S.C. 154(b) by 0 days.

(21) Appl. No.: 13/587,787

(22) Filed: Aug. 16, 2012

(65) Prior Publication Data

US 2012/0311434 A1    Dec. 6, 2012

Related U.S. Application Data

(62) Division of application No. 10/888,787, filed on Jul. 9, 2004, now Pat. No. 8,271,495.

(51) Int. Cl.
*G06F 7/00* (2006.01)

(52) U.S. Cl.
USPC .......................................................... 707/738

(58) Field of Classification Search
None
See application file for complete search history.

(56) References Cited

U.S. PATENT DOCUMENTS

2001/0025375 A1* 9/2001 Ahmad et al. .................. 725/39

* cited by examiner

*Primary Examiner* — Robert Beausoliel, Jr.
*Assistant Examiner* — Nirav K Khakhar
(74) *Attorney, Agent, or Firm* — Mahamedi Paradice Kreisman LLP

(57) ABSTRACT

A plurality of content items are retrieved from multiple network sites. Content from each content item is programmatically analyzed in order to associate that content item with one or more categories. The one or more categories may be part of a larger set of predefined categories. A network page is assigned to one or more corresponding categories in the set of predefined categories. At least some content is provided on the network page using one or more content items that were associated with the one or more categories assigned to that network page.

20 Claims, 10 Drawing Sheets catlist: business/business, law/law, law/patent-trademark

Disputed Internet patent re-examined http://www.cleveland.com/business/plaindealer/index.ssf?/base/business/1068723058247790.xml
Ohio Washington- In an unusual move, the U.S. Patent and Trademark Office is reconsidering a patent affecting Internet pages that critics contend could disrupt millions of Web sites. Citing "a substantial outcry from a widespread segment of the affected industry," deputy patent commissioner Stephen G. Kunin ordered the agency's examiners to reconsider the patent they awarded in November 1998 to three researches at the University of California. Kunin described the case as "an extraordinary situation." The patent office, which issues about 180,000 patents a year, has ordered such re-examinations only 151 times since 1981. The patent - No. 5,838,906 - affects how Internet sites build into Web pages small interactive programs that power everything from banner ads to interactive customer service. Eolas Technologies Inc., which was founded by one of the inventors and has licensed the patent exclusively, has begun enforcing its claims and recently won a $520 million jury award against Microsoft Corp., which quickly appealed the judgment. Eolas said Microsoft's Internet Explorer Web browser software - used by the vast majority of Internet users - violated its patent. Microsoft has pledged to redesign its browser early in 2004 in ways that will require Wes surfers to click on a dialogue box when they visit a site that employs one of the specialized programs. Last month, the inventor of the World Wide Web urged the patent office to re-examine the patent's validity. Tim Berners-Lee said he worried that Microsoft's redesign "would render millions of Web pages and many products of independent software developers incompatible." He also feared that Web developers would respond with their own tweaks that ignore long-standing Web standards. Kunin's Oct. 30 order was based on claims by Bernrers-Lee and others that patent examiners may not have adequately considered so-called "prior art" that suggested the researchers' ideas were not new. Kunin wrote that because of those claims, "a substantial new question of patentability exists." A patent spokeswoman, Brigid Quinn, Said the re-examination could take a year, but Eolas is permitted to enforce the disputed patent during that period. The patent office took just over four years to award the patent originally.

| About Node | | Fall | Score | GrpHits | TtiHits | Nocc | Posn | BadSt | Nsize | reg: Wds | Len | Post | Node | Freq | Short | Multi | Phrase |
|---|---|---|---|---|---|---|---|---|---|---|---|---|---|---|---|---|---|
| law/patent-trademark | 1 | | 7.84 | 3 | 4 | 4 | 2% | 0 | 56 | 4 | 27 | | | | 1 | 4 | Patent_and_Trademark_patent_office |

| About Node | | Fall | Score | GrpHits | TtiHits | Nocc | Posn | BadSt | Nsize | reg: Wds | Len | Post | Node | Freq | Short | Multi | Phrase |
|---|---|---|---|---|---|---|---|---|---|---|---|---|---|---|---|---|---|
| com/us-xpress-enterprises | 0 | -1 | 1 | 2 | 2 | 1 | 1% | 0 | 12 | 1 | 2 | 2061 | 76 | 783 | 1 | 4486 | US |
| city/durham-nh | 0 | -1 | 0 | 1 | 1 | 2 | 64% | 1 | 258 | 1 | 3 | 8610 | 70 | 38 | 1 | 8794 | Lee |
| city/lee-fl | 0 | -1 | 0 | 1 | 1 | 2 | 64% | 0 | 36 | 1 | 3 | 8610 | 70 | 38 | 1 | 8817 | Lee |
| minor-league-baseball/modestoas | 0 | -1 | 0 | 1 | 1 | 1 | 88% | 1 | 30 | 1 | 1 | 20266 | 18 | 21925 | 0 | 86059 | A |
| city/tyringham-ma | 0 | -1 | 0 | 1 | 1 | 2 | 64% | 0 | 24 | 1 | 3 | 8610 | 70 | 38 | 1 | 8794 | Lee |
| city/stephen-mn | 0 | -1 | 0 | 1 | 1 | 1 | 11% | 1 | 37 | 1 | 7 | 4328 | 6 | 50 | 1 | 4484 | Stephen |
| movie/30 | 0 | -1 | 0 | 1 | 1 | 1 | 75% | 0 | 27 | 1 | 2 | 155 | 9 | 0 | 0 | 164 | 30 |
| city/elko-nv | 0 | -1 | 0 | 1 | 1 | 2 | 64% | 1 | 435 | 1 | 3 | 8610 | 70 | 38 | 1 | 8794 | Lee |

FIG. 5 (Cont.)

SYSTEM AND METHOD FOR AUTOMATING CATEGORIZATION AND AGGREGATION OF CONTENT FROM NETWORK SITES

RELATED APPLICATIONS

This Application is a Divisional of U.S. patent application Ser. No. 10/888,787, filed Jul. 9, 2004 now U.S. Pat. No. 8,271,495 which claims benefit of priority to U.S. Provisional Patent Application No. 60/531,150, filed Dec. 17, 2003; all of the aforementioned priority applications being hereby incorporated by reference in their respective entirety for all purposes.

TECHNICAL FIELD

The disclosed embodiments relate generally to the field of content provided on network sites. More particularly, the disclosed embodiments relate to a system and method for automating categorization and aggregation of content from network sites.

BACKGROUND

With the growth of the Internet, web-sites are increasingly providing content such as news, articles, and stories. There are an increasing number of sources for content on the Internet. With this growth, content distribution on the Internet has become disorganized. For example, popular news sites carry redundant news items, so users have little need to visit more than one news source. For a user to receive comprehensive news items of a given topic, such as their local area, the user may have to visit numerous sites and materials. At the same time, a user may find it difficult to find a news item about an obscure category, such as a disease or a hobby. In such cases, users often rely on search sites, such as provided by YAHOO! or GOOGLE to locate content items of interest.

There are web-sites that categorize content for users, but in most cases, the categories are fairly broad and non-specific. For example, the typical news site will provide aggregation of news stories under headings such as World News, U.S. News, Sports, Business etc. The aggregation and categorization of such stories is typically done through some manual intervention. A typical situation is that the story is categorized in a general category at its origin, and then distributed for consumption or display on multiple web-sites. Another situation is that editors provide keywords in a story, or associate the keywords with the stories, so that when someone types a search term at a search site that matches the key word, the story will be presented in the search result.

Some sites provide category-specific content by searching for content that matches a particular search term. Such sites typically rely on the use of search terms to ensure that a particular content item is sufficiently pertinent to a particular category. When content is identified, it is known to belong to a category of the search term.

SUMMARY OF THE INVENTION

According to embodiments described herein, a plurality of content items are retrieved from multiple network sites. Content from each content item is programmatically analyzed in order to associate that content item with one or more categories. The one or more categories may be part of a larger set of predefined categories. A network page is assigned to one or more corresponding categories in the set of predefined categories. At least some content is provided on the network page using one or more content items that were associated with the one or more categories assigned to that network page.

BRIEF DESCRIPTION OF THE DRAWINGS

FIG. 5 illustrates processes that form part of a programmatic analysis to categorize content items based on the item's text, according to an embodiment.

Figure 1:
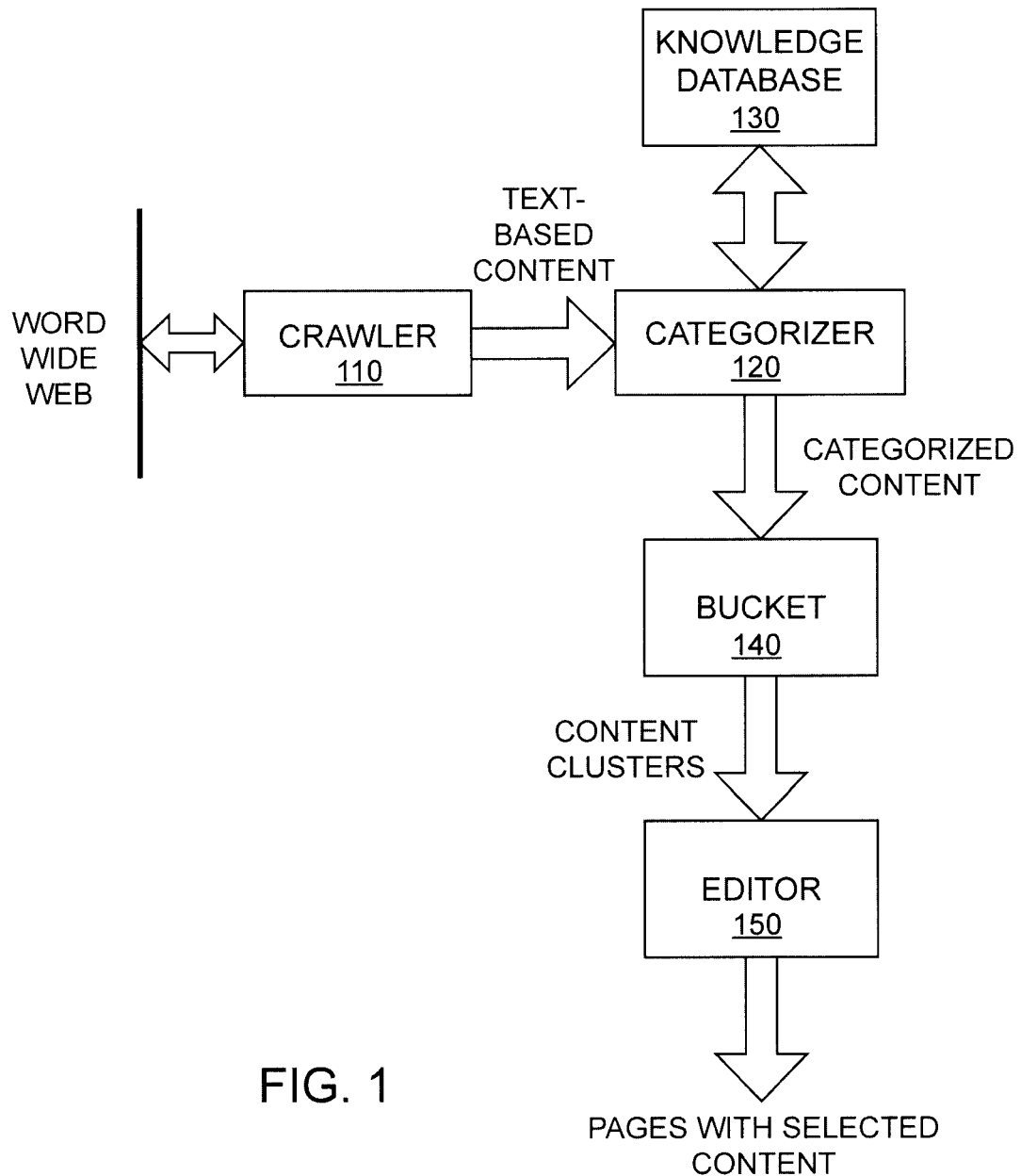
FIG. 1 illustrates a system for retrieving, categorizing and aggregating content for display on a network, according to an embodiment.

In the drawings, the same reference numbers identify identical or substantially similar elements or acts. To easily identify the discussion of any particular element or act, the most significant digit or digits in a reference number refer to the Figure number in which that element is first introduced. Any modifications necessary to the Figures can be readily made by one skilled in the relevant art based on the detailed description provided herein.

DETAILED DESCRIPTION

Overview

Embodiments of the invention describe a system and method for automatically retrieving, categorizing and displaying content from a network. An embodiment of the invention enables category-specific content to appear together at one site or location on a network. One result that may be achieved is that a user may access and browse the site or location where category-specific content is aggregated and updated.

In one application, a web page is provided that can be browsed by a user, where the web page includes content dedicated to a particular category. The content may include links to articles, news stories and other content items that are about the particular category. For example, the user can view a web page having updated news stories about a particular hobby, disease, person of interest or company. These articles and news stories may be retrieved from various other network sources, and presented on the page to maximize interest and reduce redundancy. As such, the user is provided with an alternative to having to submit search queries in order to view category-specific content items.

In an embodiment, a large number of content items may be retrieved and categorized into an even larger number of categories through programmatic implementations. This allows for content to be generated for various category-specific web pages (or portions thereof). The content for each page may be retrieved automatically from various network sites.

One embodiment provides an automated process where content is categorized, aggregated and selected for display on category specific pages. This enables the creation of category-specific web pages that provide fresh and pertinent content for a specific category. Readers interested in a particular category may view a web page as a single source where information about the category of interest is provided. An embodiment such as described may obtain content for such pages from numerous sources that most users would not have time to access manually. The user may not even have knowledge of all the different sources that provide content about that particular category at a given moment.

According to an embodiment, a plurality of content items are retrieved from multiple network sites. Content from each content item is programmatically analyzed in order to associate that content item with one or more categories. The one or more categories may be part of a larger set of predefined categories. A network page is assigned to one or more corresponding categories in the set of predefined categories. At least some content is provided on the network page using one or more content items that were associated with the one or more categories assigned to that network page.

Examples of content items include news items and events, announcements, messages, press releases, product and pricing advertisements (or other information), sale information (e.g. department store sale), pricing events, and articles. In one embodiment, content items include text segments that can be used to perform analysis operations described herein. The term "content" may refer to reproductions or derivations of content items, summaries, segments or portions of content items, and/or links to other network sites where the content items are provided.

Embodiments of the invention categorize content items into a selected set of categories. The selected set of categories are from a much larger number of possible categories. In one embodiment, the total number of possible categories in which news items pertain to is of the order of $10^3$ or greater. A category may be broad, such as a genre (entertainment, business, news items), or specific (individual celebrities, professional athletes, companies). Categories are identifiable by sub-categories (e.g. entertainment is defined by individual celebrities and movie titles) and/or by key words, phrases, or text-strings. However, as will be described herein, the occurrence of a key word, phrase or text-strings that is a category identifier may only trigger a determination as to whether a particular content item containing that identifier should be associated with the category identified by that identifier.

An embodiment of the invention may be implemented on or with a network such as the Internet. For example, content items may correspond to news stories, articles and other documents made available at any one of the plethora of web-sites where news and other content is provided.

The term "programmatically" means an automated step, or substantially automated process performed through use of computer-executable instructions, such as by processors which execute instructions in the form of programming code.

As used herein, the term "module" includes a program, a subroutine, a portion of a program, a software component, firmware, a hardware component, or a combination thereof, capable of performing a stated task or function. A module can exist on a single machine, or be distributed to more than one machine.

Embodiments described herein may include instructions that are carried on or executed by a computer-readable medium. As used herein, a computer-readable medium may include any machine or device having resources to execute, store, or otherwise carry instructions for performing operations and steps of embodiments described herein. Modules and software components described herein may be executed on one or more machines and by one or more devices. Instructions for executing modules and software components may be carried in memory mediums, either internally or externally from machines on which instructions are executed.

According to another embodiment, a method is provided in which a plurality of content items are retrieved from one or more network sites. Content for each of the plurality of content items is analyzed in order to associate that content item with one or more categories in a larger set of categories.

System Overview

FIG. 1 illustrates a system for retrieving, categorizing and aggregating content for display on a network, according to an embodiment. The system may be comprised of a combination of modules or components that cooperate with one another. A system such as described automates the acts of retrieving and sorting content items into categories through the user of a combination that includes a crawler 110, a categorizer 120, and a knowledge database 130. The system may aggregate or select content for display based in part on the retrieved content through the use of a bucket 140 and an editor 150. The system may operate on a network such as the Internet.

A system such as described in FIG. 1 may be used to maintain numerous pages, and each of the pages may include categorized content that is aggregated and maintained in an updated state. Each page or document may display aggregated content from various network sites based on one or more specific categories assigned to that page. Each page may be routinely and automatically updated using additional content aggregated from any one of the numerous web sites that the system accesses. In one embodiment, the pages on which the system maintains and provides content are made available to users over the Internet.

Crawler 110 may be configured to visit pre-determined network sites where news stories and other content are periodically provided. For example, newspaper cites and cites that carry wire services for major news organizations such as REUTERS, ASSOCIATED PRESS, NEW YORK TIMES, and BLOOMBERG may be periodically accessed. In addition, crawler 110 may access local (geographic specific) news resources, journals, real-time information providers (stock quotes from stock exchanges), web clippings, message boards, online retail sites (including sites where pricing information for "brick and mortar" outlets are provided), or any other site where content is provided and updated on occasions. Crawler 110 may be configured to automatically provide registration information from sites that require users to be registered. For example, crawler 110 may enter login, password, or otherwise perform a script in order to gain access to a web-site. In addition, crawler 110 may be configured to visit individual sites at particular times, or at designated frequency intervals. For example, crawler 110 may be programmed to visit different network sites at different intervals based on how frequently different web sites are known to refresh their own content.

In an embodiment, crawler 110 provides text-based content to categorizer 120. Categorizer 120 works with knowledge database 130 to categorize content provided by crawler 110. In particular, categorizer 120 and knowledge database 130 may combine to determine one or more matching categories for a particular content item. In an embodiment, categorizer 120 uses multi-dimension or multi-space algorithms in order to sort specific content items into one or more of the categories defined in the knowledge database 130. Categorizer 120 may analyze text from the content items in order to find text-string combinations which match specific category definitions. Knowledge database 130 may store category definitions (described in more detail with as nodes in FIG. 5) which consist of a set of text-string combinations that are identifiers of a particular category. Identifiers may be of different degrees. Some identifiers may be used to increase confidence, others to be more determinative. A more detailed explanation of how a category identifier is used is provided with FIG. 5.

A category identifier may be either one of a required or pertinent set of text-string combinations. As will be described, one embodiment provides that the presence of one or more words, phrases, names or other text-strings from the required set of a given category definition triggers the system into considering that category as a candidate category that matches the content item. The presence of additional identifiers, whether from the required or pertinent set, may be considered in a subsequent determination of whether the given category is a good match for the content item.

Thus, the occurrence of a single text-string that corresponds to a category identifier is, by itself, often insufficient to match the content item of the text-string to the category of the identifier. Rather, the presence of the identifier in the content item marks a candidate category that is subsequently analyzed. Additional analysis is done on the content item. According to one embodiment, for any given candidate category, the additional analysis factors in the following: the number of identifiers (required and pertinent) in the content item, the commonality of the identifiers that are present, the placement of the identifiers in the content item, the relation of the identifiers with surrounding text, the character length of the identifiers, and a general measurement of how well individual identifiers identify a category based on the size of the category definition and other factors. Other factors may also be used.

In one embodiment, knowledge database 130 contains a large number of nodes, alternatively referred to as category identifiers. In one application, the total number of nodes that can be maintained may exceed the order of $10^3$. For example, in one specific application, the number of nodes maintained by the knowledge database is of the order of $10^6$. A system such as described herein is capable of retrieving content items from various sources and categorizing content from the content items into any one of the plethora of categories. One application for such an embodiment is a web-site that provides thousands, or tens of thousands (or more), of internal web-pages, each specific to one category, or alternatively to a small set of categories. In such an application, each internal web page is a site where category-specific content is aggregated, and possibly selected for display.

Past attempts to aggregate and categorize content for display on network sites have focused on using a combination of manual editing, and/or key word queries to locate, categorize and select content for display. Such attempts have been limited in their ability to categorize data into anything but a small set of categories. For example, many news sites that pull news from other web sites, display news items in broad categories, such as World News. Sports, Health, Business etc. In contrast to such systems, embodiments described herein can, for example, host one page for each publicly traded company in a general Business category, and on each company-specific page, news items for that company are frequently retrieved and displayed. This gives the user the ability to view fresh news items for one company at one site, rather than making the user sift through a broader general category for news that may or may not be of interest. Websites such as google.com provide the user with the option of searching news items based on a keyword query. However, such sites provide only search results for a user's query. The user still has to sift through the search results, which may or may not be of interest. There may have been problems with the user's search (such as one of the keywords having two different meanings). Furthermore, the search results only locate stories with given keywords, the search results make no determination as to whether the story is likely to be of interest. In contrast, embodiments described herein enable generation of web pages where content is category-specific and likely to be of interest to someone who is interested in category of the web page.

Crawler 110 may retrieve thousands of items, such as articles and news stories, in a given interval of time (such as a day) using a large number of sources (such as web-sites where articles are published). Next, categorizer 120 scans text content from the content items in order determine candidate categories. As stated, candidate categories may refer to each category that has an identifier in the text content of the item. In one application, the scan of a given item yields tens or hundreds of candidate categories. Categorizer 120 makes a determination from the candidate categories as to which categories are most appropriate for a given content item using the algorithms (such as multi-dimensional processes described with FIG. 5).

In determining what category matches a particular content item, categorizer 120 may make the following determinations, either absolutely or in terms of probabilities: (1) associate a text-string with a candidate category; (2) determine whether the text string is in fact referring to the candidate category; and (3) if the text string is determined to refer to the candidate category, determine if the candidate category the subject of the content in the content item (i.e. is the article about the candidate category?).

Knowledge database 130 may include information for use in analyzing the applicability of a category identifier to a particular category. In one embodiment, knowledge database 130 includes information for enabling the categorizer 120 to make the first two determinations of the preceding paragraph. Specifically, knowledge database 130 may correlate text-strings with categories, and also provide information in order to determine whether the occurrence of the text-string implies the content item is in fact referring to the correlated category.

The information maintained by knowledge database 130 may include information that indicates the commonality (or inversely the uniqueness) of particular category identifiers. Commonality and uniqueness are factors which influence the confidence that the presence of a particular category identifier in the text of a content item in fact means that the content item is about the category of that category identifier. For example, knowledge database 130 may contain information from the British National Corpus on how common (or unique) a particular word or phrase is. Similarly, the United States Census Bureau publishes the 5000 most common first names, and the 35000 most common surnames. The commonality of geographic places, such as city and street names, may be obtained from sources such as RAND MCNALLY.

To provide one example, the appearance of text string "Bill Gates" may identify MICROSOFT and BILL GATES as candidate categories. But knowledge database 130 will also factor in the possibility that "Bill Gates" may mean a different person, based on the U.S. Census Bureau information indicting Bill and Gates are semi-common first names and surnames. If the same article includes the word "windows", the commonality of that word may be determined by the British National Corpus. Thus, knowledge database 130 may determine the likelihood that the article is referring to BILL GATES and MICROSOFT based on the commonality of the name and of the word "windows". Information for determining commonality/uniqueness of words, names and phrases may enable categorizer to determine a likelihood that "Bill Gates of Topeka, Kans. was standing by his window when he saw his neighbor's house burning," is not a story about Bill Gates, founder of Microsoft.

It should be noted that even if occurrence of "Bill Gates" and "window" is deemed to be a likely reference to the more famous founder of MICROSOFT, additional analysis is performed to determine if the article is in fact about MICROSOFT or the famous founder of that company. For example, categorizer 120 may be configured to decipher that a story line "After winning the lottery, John Smith may just as will be Bill Gates when he invented Windows," is a story that is not about the founder of MICROSOFT. A more detailed description of how such determinations are made is provided with embodiments described below.

Categorizer 130 outputs categorized content. Categorized content includes content from items that have been categorized into one or more categories. In one embodiment, text from a content item is outputted and assigned to a small set of categories.

Bucket 140 groups categorized content. In one embodiment, categorized content for each category is aggregated as it becomes available. The output of bucket 140 includes content clusters, which refers to a set of aggregated content for individual categories. The aggregated content may include text from the original content item. In addition, graphics, such as images, may be stored with the text content from the item. Some or all of the text from a particular content item may form the content from that item that is part of the set of aggregated content. It is also possible for the image or graphics originally provided with the content item to form part of the content from that item, and as such, be part of the set of aggregated content.

Aggregated content for each category is provided to a module referred as editor 150. Editor 150 selects which of the aggregated content is to be displayed at a given interval on a corresponding network page of that category. Editor 150 performs operations for generating displayed content from the aggregated content clusters. Editor 150 selects what content is to appear on a network page using a set of selection criteria or rules. According to one embodiment, bucket 140 uses content analysis of each item forming the aggregated content to determine when items in the aggregated content are the same, or at least very similar. Editor 150 selects content items from the bucket 140. One criteria that may be used by editor 150 to select items from the aggregate content is to exclude redundant content items from appearing on the page. For example, if two stories in the aggregated content each contain an identical portion, the editor 150 may determine that only one of the two stories needs to appear on the page. Another rule or factor that may be used to select a particular content item from the aggregated content is the source of the content item. For example, some web sites may be preferred over other web sites as sources of news stories. Other examples of factors that can be used in selecting what content to display from aggregated content items include key words or phrases and freshness. Additional factors that may be used include, location/source of content items, location of subject of content items, prominence of content item, geographic distance between a subject of the content item and the location of the readers, and geographic distance between subject of content item and source of content item.

In one embodiment, aggregated content may individually be presented in the form of short summaries, headlines, and sub-headlines, with links to the entire content item. The link may be to the network site where the content item was originally retrieved from and analyzed.

Methodology

FIGS. 2-6 illustrate methods, according to embodiments of the invention. Embodiments such as described in FIGS. 2-6 may be performed though use of machines that can execute instructions stored on computer-readable mediums. Specifically, methods such as described in FIGS. 2-6 may be performed by one or more processors, which execute instructions for performing steps or operations of the methods described. A system such as described in FIG. 1 is an example of a suitable system for performing methods such as described below. Any reference to an element of FIG. 1 is made solely for illustrative purposes.

Figure 2:
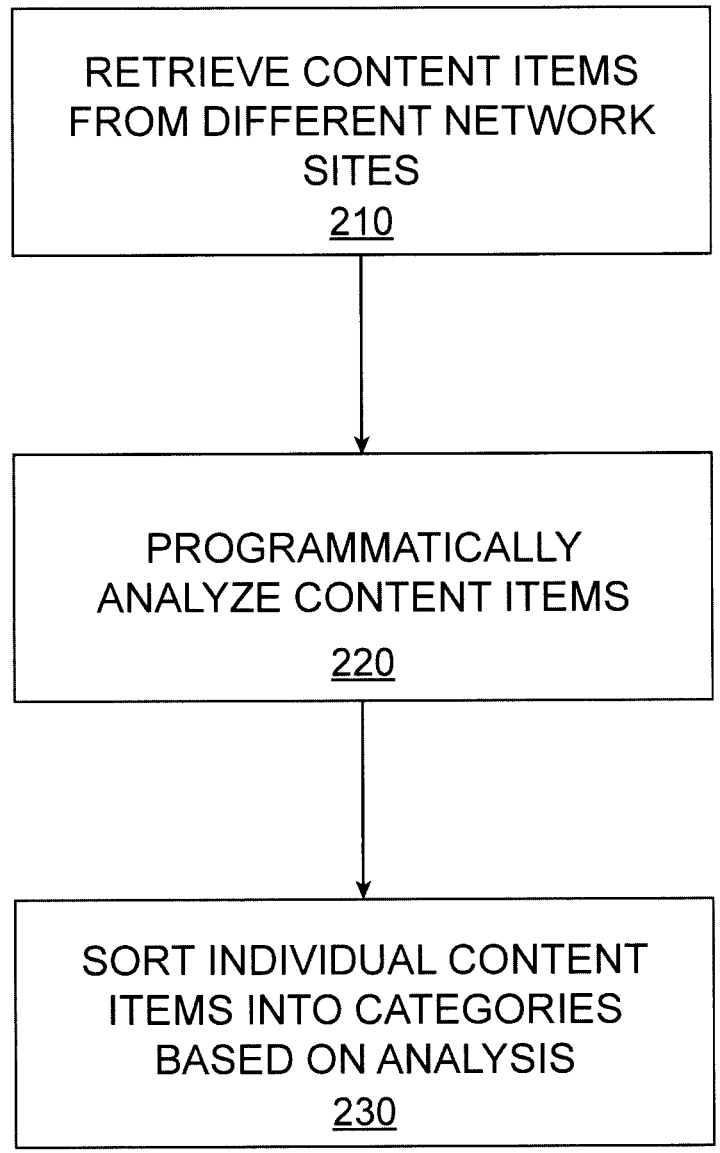
FIG. 2 illustrates a basic method for automatically analyzing content items for categorical content, according to an embodiment.

FIG. 2 illustrates a basic method for automatically analyzing content items for categorical content. As described, a step 210 provides that content is retrieved from different network sites. For example, content may be retrieved from different web-sites using a crawler 100. Examples of network sites that can be used to retrieve content items includes web-sites where articles such as news stories are provided. Other examples include sites where press releases, product listings, advertisements, events and other news worthy or content of interest items are provided.

Step 220 provides that content items are programmatically analyzed in order to determine which one of a predefined set of categories belong to that item. For example, this step may be performed by categorizer 130 using knowledge database 120 to analyze text from a news story. The knowledge database 130 may contain information for defining a large number of categories. The text from the news story may be automatically scanned for text strings that identify candidate categories. A series of analysis tools may be used to determine which candidate categories are potentially related to the content item.

In step 230, the analysis performed in step 220 is used to sort the items retrieved in step 210 into one or more of the predefined categories. In one embodiment, the category or categories that are assigned to the content item are selected from the candidate categories. For example, one news article may generate hundreds of candidate categories. Of the candidates, a programmatic determination is made to determine which categories are most appropriate for a given content item. The content item is assigned to one or more categories that are deemed appropriate based on criteria and ruled for determining which candidate categories are most relevant or accurate in identifying the best category for a particular content item.

Figure 3:
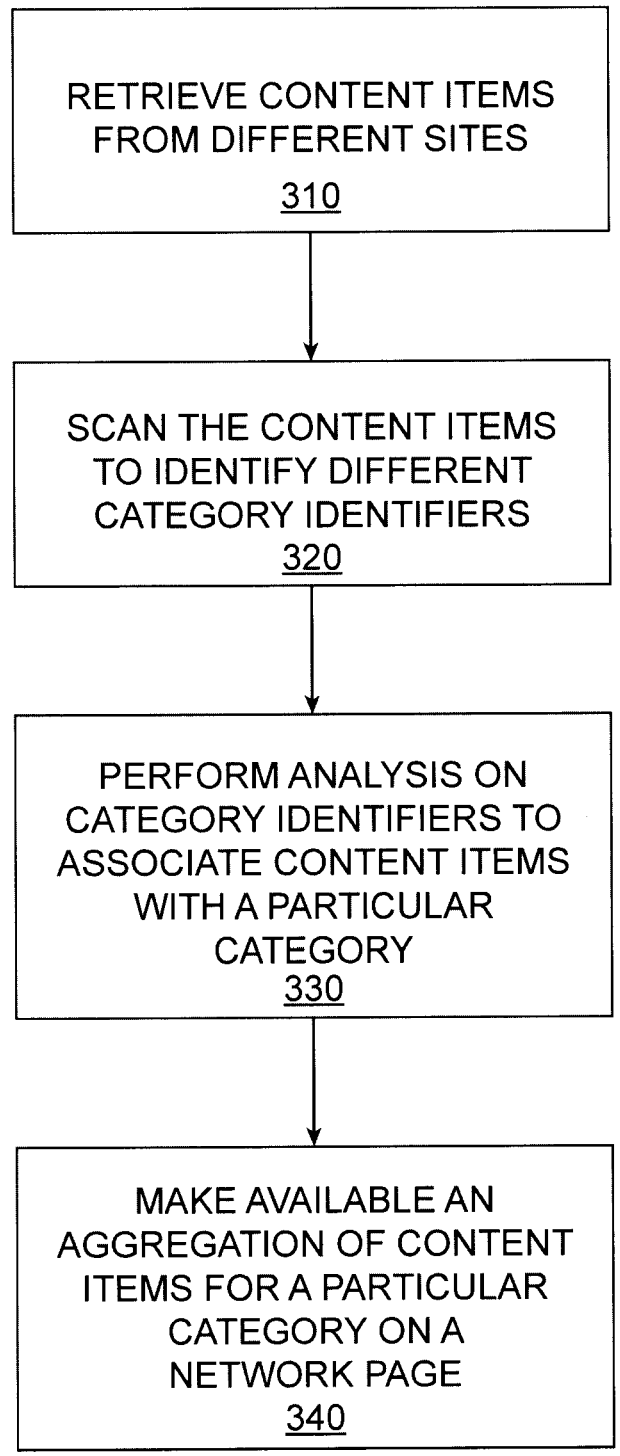
FIG. 3 illustrates a method in which categorization of content items is performed in order to aggregate and display content on network pages corresponding to one or more categories, according to an embodiment.

FIG. 3 illustrates a method in which categorization of content items is performed in order to aggregate and display content on network pages corresponding to one or more categories, according to one embodiment of the invention.

Step 310 provides that content items, such as articles, news stories etc, are retrieved from different web sites (assuming use of a network such as the Internet).

In step 320, the content items are scanned in order to identify category identifiers. In one embodiment, text content of the content items is scanned. An attempt is made to find as many category identifiers as possible in the text content.

Step 330 provides that an analysis is performed of the category identifiers identified from the scan of the content item. A more detailed discussion of the analysis performed on the category identifiers is provided with FIG. 5. The analysis is performed to identify which categories should be assumed as being most relevant to the particular content item.

In step 340, an aggregation of content items is made available for a particular category. The aggregation may be made available visually on a page that is accessible to others over a network (such as the Internet). The aggregation of the content items may be in the form of a summaries or edited versions of the content items appearing on the page together Links to network sites where the content items are actually provided may also be included as, or part of, the aggregated content.

Figure 4:
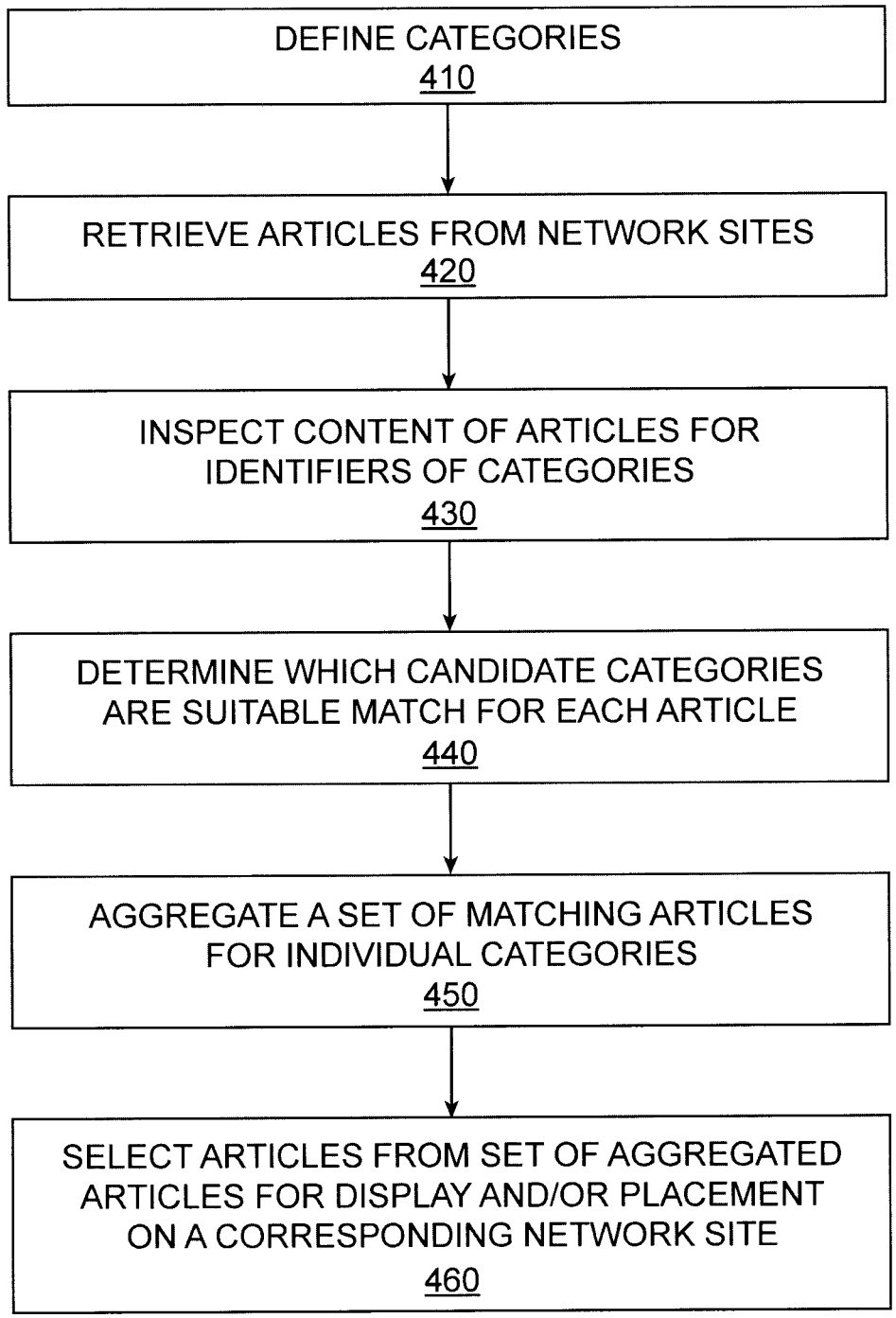
FIG. 4 is a method illustrating automated retrieval, categorization, aggregation and display of content items, according to an embodiment.

FIG. 4 is a method illustrating automated retrieval, categorization, aggregation and display of content items. In step 410, categories are defined by one or more identifiers. A category definition may include a set of names, words, phrases, geographic locations or other text strings. For example, the category definition for a celebrity may include the celebrity first name, last name, nickname, film biography, and possibly the place of residence or birth for the celebrity. The category definition for a location may include the name of the place, the name of geographic identifiers of the location, longitude and latitude of the location, historical names and nicknames for the location, the names of parks, bodies of water, tunnels, rivers, schools jails, businesses (restaurants etc), and any other information that is indicative of that location.

In step 420, articles (or other content items) are automatically retrieved from multiple network sites. For example as discussed with other embodiments, web sites where news items, articles, messages etc. may be routinely accessed, and content appearing thereon may be retrieved.

Step 430 provides that the content of the articles are scanned, or otherwise inspected for identifiers of categories in order to identify candidate categories. In one embodiment, text is scanned for names, words, phrases, geographic locations and other text strings that correspond to identifiers of categories. A candidate category means that an identifier of that category appears in the article, but other analysis needs to be performed in order to be able to conclude that the article belongs in that category.

In step 440, an analysis is done to determine which candidate category or categories is a suitable categorical match for the particular article. A more detailed explanation of the process for performing the analysis is described with FIG. 5. The result of performing the analysis of this step is that the article is assigned to one or more categories.

In step 450, articles matching a particular category are aggregated. In the case where a category is specific (such as a specific celebrity or athlete), the rate at which articles are accumulated may be relatively slow. For categories that match genre's (such as entertainment and sports), the rate of accumulation may be fairly quick. In many cases, there may be too many articles to be displayed on one screen or network page.

In step 460, articles from the set of aggregated articles are selected to be displayed or otherwise rendered in a medium that is specific to the category of the articles. This step may be performed in order to select what articles are made available on a network page, placement of articles or links to articles on a page, and what portion or even information is displayed about selected articles on the page. The selection process may be based on several factors. In one embodiment, these factors include (1) how recent article was published, (2) amount of interest in the article from the public (information may be obtained from the source or from the subject matter or identifiers in the article) (3) the degree to which a particular article varies from other articles that have been aggregated for the network page (e.g. does the article share the same identifiers as other articles for the same category), (4) the degree of confidence that exists in the determination that the article belongs in the category, (5) how geographically close the content items are to the subject of the content items; (6) the geographic distance between a location of the content item and a location of the reader, (7) prominence of the source of the content items (e.g. national newspaper), and (8) how often the source of the content item reports about a particular subject. With respect to (8), an example is a publication that is authoritative for a particular topic. For example, an automotive racing magazine is more authoritative about a race car driver or racing story than a local news paper. Therefore, in the example provided, one embodiment may provide more weight to news stories identified as belong to an automobile racing category when the news stories originates from the more authoritative source (the magazine).

Categorization

As described above, embodiments of the invention provide for automatic categorization of content retrieved from different network sites. In one embodiment, text content in different articles is retrieved and scanned for category identifiers, which may be in the form of words, phrases, names or locations. For each category identifier in a given article, additional analysis is performed in order to determine whether an article is about or otherwise belongs in a category.

FIG. 5 illustrates a programmatic analysis performed on text content 510. An analysis such as described herein may be performed by a system such as described in FIG. 1. Reference to elements of FIG. 1 are made for illustrative purposes only. In an embodiment, text content 510 corresponds to content that is read from an article on a network site. The results of the overall analysis is a determination of an appropriate category for the text content 510. FIG. 5 shows results of several independent processes performed as part of the overall analysis for assigning the article to a category. Each category may be represented by a node. A node may defined by a set of identifiers, which include words, phrases, names and other text-strings. In one embodiment, each node includes, as identifiers, one or more of (i) required term(s) and (ii) pertinent term(s). A required term may correspond to a category identifier that is fairly unique to a particular category. The existence of a required term in text invokes the category of that required term as a candidate. In one embodiment, a node may have one or more (even several or hundreds) of required terms. One embodiment provides for the node to be a candidate for a particular category, at least one of the required terms has to be present in the text content.

For example, the full name of a celebrity, together in one text string, is an example of a required term for that celebrity. A common nickname used to identify that celebrity (e.g. "Madonna" or "Prince") may also correspond to a required term for a celebrity. The pertinent term is a term that is more common to multiple nodes. For example, the term "Corvette" may be a pertinent term for the artist "Prince", and specifically to a song by the artist, but "Corvette" itself could be a reference to car model. Thus, support terms are used to build confidence that the candidate node is actually being referenced, and even is the subject matter of the text content.

According to one embodiment, the existence of required terms and support terms is used to quantify a likelihood that (i) a given article is in fact referencing the category of the node, and (2) the category being referenced is a subject of the article, so much so that the article should be assigned to that category. A more detailed description of the quantitative analysis is provided below.

According to one embodiment, knowledge database 130 may store node definitions, including required terms and support terms for each node. The categorizer 120 may perform individual processes of the overall analysis in determining when a node matches an article. The determination that a node matches an article may be made automatically, through programmatic means, such through instructions executed by categorizer 120.

A node may be invoked as a candidate if one of the required terms for that node appears in the text content. Thus, each candidate node in column 514 has at least one required term from text content 510. The column 546 lists at least one of the required terms that appear in the text content 510 for a candidate node. For example, in column 546, the phrase "Patent and Trademark Office" is an identifier (a required term) for the node "law/patent-trademark". To further the example, the presence of the name "Lee" is a required term for the node "city/durham-nh" and "city/lee-fl".

A column 514 lists nodes by name or node identification. Prior to completion of the analysis, all listed nodes are candidates. In the example provided, only one node is a matching node for the particular text item. This node is indicated in a separate row 540. Various parameters are determined about each mode in order to determine whether a particular node is a matching node for the particular text item. A column 512 lists a binary parameter that is assigned a value based on a determination of whether the category of that row is a subject of that article. For this parameters, the value of "1" indicates that node is a subject of the article (alternatively phrased, the article is about the category of the node). The value "0" indicates that the article is not about the category of the node. For the node to be a matching node, the value of the column 512 would need to indicate that the article is sufficiently about the category of the node to warrant a positive value. The determination of the value of column 512 may be made based on the value of the other parameters.

Column 516 lists a Fail Parameter for each candidate node. The Fail Parameter is a Boolean determination as to whether the candidate node is actually being referenced. It indicates whether reference to the required term of a given candidate node is an accurate semantic reference. For example, in the example provided, "Stephen, Minn." is being referenced as a city because the article quotes a person named "Stephen". Even though "Stephen" is a required term for "Stephen, Minn.", the article is not actually referencing the town. Thus, the node "Stephen, Minn." is assigned a negative Fail Parameter, as the reference to the required term of that node is not accurate.

The determination of Fail Parameter is based on a commonality determination. Factors that affect the commonality determination include the commonality/uniqueness of the required term, as well the length of the string for the required term. Short and common required terms indicate a negative Fail Parameter, while, long and unique strings indicate a positive value. In the example, "Patent and Trademark Office" is an example of both a long and unique string, while the string "Lee" is an example of a short, non-unique identifier that yields a negative result. A positive Fail Parameter result increases the confidence that a node is a matching node.

Column 518 lists the Score Parameter for each candidate node. The Score Parameter is another confidence rating that the reference to the required term is semantically accurate. This Score Parameter may be based on commonality of the required term, as well as other factors.

Column 520 and 522 provide Group Hits and Total Hits parameters. Each required term may be part of a group of terms that are equivalent in semantics, but different in syntax. For example, the locations "Mt. Lebanon. Penn." and "Mount Lebanon, Pa." are semantically equivalent references to the same city. The parameter Group Hits measures the number of hits an entire group of required terms receives. Depending on use and learning algorithms, there may be a difference between 3 hits to one group, and 3 hits to three groups. The Total Hits parameter measures how many total hits of identifiers (required terms and supplemental terms) are in the text content 510 for a given candidate node.

Column 524 lists the parameter "Number of Occurrences" for each candidate node. The Number of Occurrences counts the number of times the required terms of the candidate node appear in the text content 510.

Column 526 lists the parameter "Position". The Position parameter is a measurement of proximity between the start of the article and the first required term of the candidate node. Confidence is increased when a required term is close to the start of the article. One exception is that a geographic node may contain a required term at or near the end of the article.

Column 528 is a Boolean parameter "BadState". The BadState parameter is an indication that there is a bias towards a candidate not being a matching node, where the indication is based on geographical data in the content item.

Column 530 indicates a value for the parameter "Node Size". This parameter is a measurement of the number of required terms and pertinent terms in a particular geographic node. In the event that two geographic nodes are equally suitable matching nodes for a given article, this parameter assumes the node with the most required terms is the more popular, and thus more likely the subject of the given article. For example, "New York City" may have numerous required terms and pertinent terms, including "York", "Big Apple" and "Empire State Building". The Node Size parameter may be used to distinguish an article as being about or more pertinent to New York City, as opposed to York, Pa.

Column 532 lists the parameter "Words". This is a count of the number of words for the required term of the candidate node that appears in the text content 510.

Column 534 lists the parameter "Length". This is a count of the number of characters for the required term of the candidate node that appears in the text content 510. With both the Words and Length parameters, the greater the value, the more unique the required term that appears in the article. Consequently, the greater the value of the Fail parameter, and the more likely that the candidate node is a matching node.

Column 536 lists the parameter "Post". This parameter measures the number of nodes in the knowledge database 130 which list the required term as part of a longer string of characters as a required term. For example, the required term "San" will produce a large value because of various cities and streets that start with the three letters. The higher the value, the less likely the candidate node is a matching node.

The column 538 provides the parameter "Node". This node is similar to column 536, in that it measures the number of nodes that contain the required term of that candidate node. As with the Post parameter, the greater this value, the less likely that the candidate node is a matching node.

The column 540 lists the parameter "Frequency". It measures the number of times that the required term appears as any part of any identifier for any node.

The column 542 provides the parameter "Short". The Short Parameter indicates a probability that the required term of the candidate node appears in the text content as part of a proper noun. Words immediately before and after each required term may be inspected for capitalization in determining this Boolean value. For example, if the required term is capitalized, not at the beginning of a sentence, and preceded or followed by another capital letter, the Short Parameter may indicate that the required term is part of a proper noun. For example, in the example provided, "Stephen" is shown as a proper noun, as it is followed by "Kunin"

Column 544 lists the parameter "Multi". This parameter is a combination value of one or more preceding values. For example, it may be a summation or average of two or more preceding parameters. The lower this number, the more likely that the candidate node is a matching node.

The parameters in columns 532-544 indicate processes performed on required terms of candidate nodes. The same processes indicated by the parameters in columns 532-544 may be performed on support terms of each candidate node. That is, text content 510 may be scanned for support terms of each candidate node. For identified support terms, the Word Parameter, Length Parameter, Post Parameter etc. are determined. In general, analysis for support terms provide confidence for a candidate term, but are not determinative.

A learning algorithm may be implemented in order to train a system to use the various parameters to match categories to articles. The system may be trained to weight parameters, determine overall scores, and draw conclusions for determining when candidate nodes are matching nodes. In one embodiment, a learning process is conducted where each matching node of an article is manually inspected to determine whether the article and node are a good match. When bad matches are found, a system such as described in FIG. 1 is trained to identify a bad match when a combination of parameters in the future yield worst values on each dimension. The manner in which support terms influence analysis of required terms may also be toned with experimentation and learning processes. With use of a learning mode and implementation, a set of rules may be developed that instructs a system on how to treat the occurrence of given values, or conditions, when analyzing the content.

Displaying Categorized Content

Figure 6:
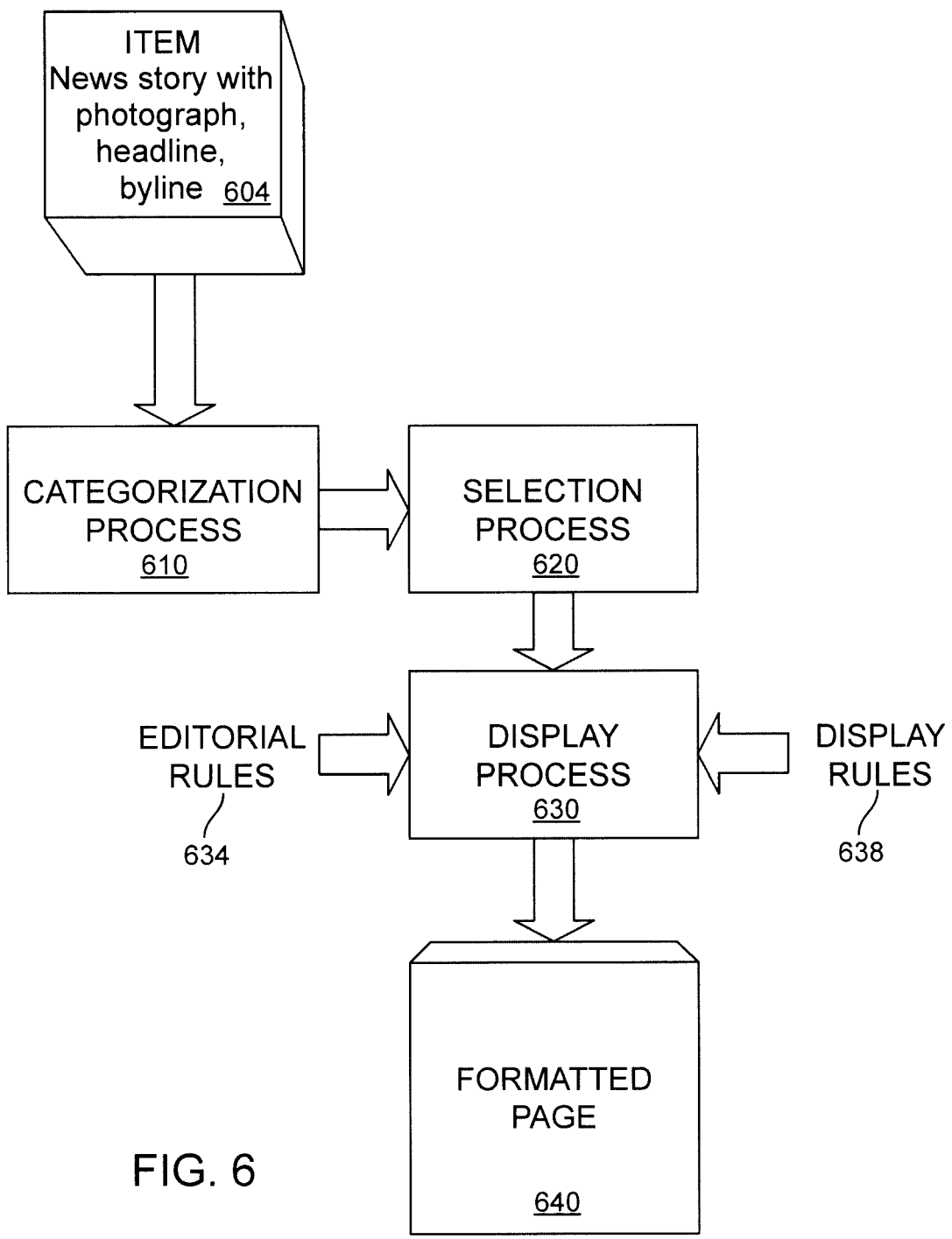
FIG. 6 is a block diagram of a system that produces formatted network pages where content is aggregated based on categories, according to an embodiment.

According to one embodiment of the invention, categorized content is aggregated on separate network pages, sites, or page portions, and then made available to users over a network such as the Internet. FIG. 6 illustrates a system where aggregated content can be displayed on a network page.

FIG. 6 is a block diagram of a system that produces formatted network pages where aggregated content is provided based on categories. In one application, a system manages content for a plethora of network pages, and each of the network pages provides selected (when possible) aggregated content for a particular category. A system such as described in FIG. 6 may be substantially automated.

FIG. 6 illustrates a content item 604 that retrieved from a network site, such as a web site where content is provided and updated. In an example provided, the content item 604 is in the form of a news story, with text content and an image. To further illustrate, the text content may include a headline and/or by line.

A categorization process 610 performs an analysis such as described with FIG. 5 in order to associate or assign the item 604 to a particular category. Once the item 604 is assigned to the category, the item becomes aggregated with other items. Thus, there may be several items that are assigned to the same category. In many cases, there may be too many items assigned to the same category, in that there is not enough desirable space of time to display every article on the network page. Details for categorizing and aggregating content items are described with previous embodiments.

In an embodiment, once item 604 is aggregated with other items of a common category, a selection process 620 is performed. Suring the selection process, a determination is made as to whether the item 604 should be displayed on the network page over other items. The selection process 620 may be performed using some or all of the criteria listed in FIG. 4.

If item 604 is selected for display, a display process 630 is performed in order to configure and format the item 604 for display on a formatted network page 640. If the content item was originally displayed on its network site with an image, display process 630 may store and retrieve that image for display on the formatted page 640. Display process 630 may also execute different sets of rules for formatting and configuring content from the item 604 on to the network page 640. In one embodiment, display process 630 may use a set of editorial rules 634 to conform content from item 604 to standard journalism editing rules. For example, if a person is provided in the image that is to be presented with the text on the formatted page, the image is positioned so that the person is facing inward. Another editorial rule (based on journalism standards) is that a headline should not exceed ten words. Thus, if there is a headline that exceeds this number on the original site, the display process 630 may, through implementation of the editorial rules 634, replace or truncate the headline. A complete list of suitable rules for conforming to journalism standards and guidelines may be found in "The Associated Press Stylebook and Libel Manual," Norm Goldstein, Editor.

The display process 630 may also use a set of display rules 638 to format content from item 604. For example, the appearance, font and portion of the content from item 604 may be determined from the set of display rules 638. Display rules may provide how often content is updated on certain portions of the category page. For example, with reference to FIG. 9, content in column 910 may be updated faster than content on column 920. Furthermore, the two columns may display content according to different formats (e.g. size).

The result of the display process 630 is the formatted network page 640. The content appearing on the formatted page 640 may be updated automatically continuously, or repeatedly over the course of a given time period. Furthermore, it is possible for content appearing on the formatted page 640 to originate from numerous sources on networks such as the World Wide Web, because categorization, aggregation and selection of the content items is done automatically. Without manual editing, a large number of network sites can be checked for articles, news items etc. pertaining to a specific category of the network page. Furthermore, the large number of resources can be updated more rapidly. In one application, the result is a network page that contains fresh content pertinent to a very specific subject and from numerous sources on the Internet.

Displaying Associated Categories with Categorized Content

The use of categorization processes to categorize and aggregate content has several applications. Among these applications, it is possible to indicate suggested content to the reader of a content item, where the suggested content is independent in subject matter from the content being viewed.

Figure 7:
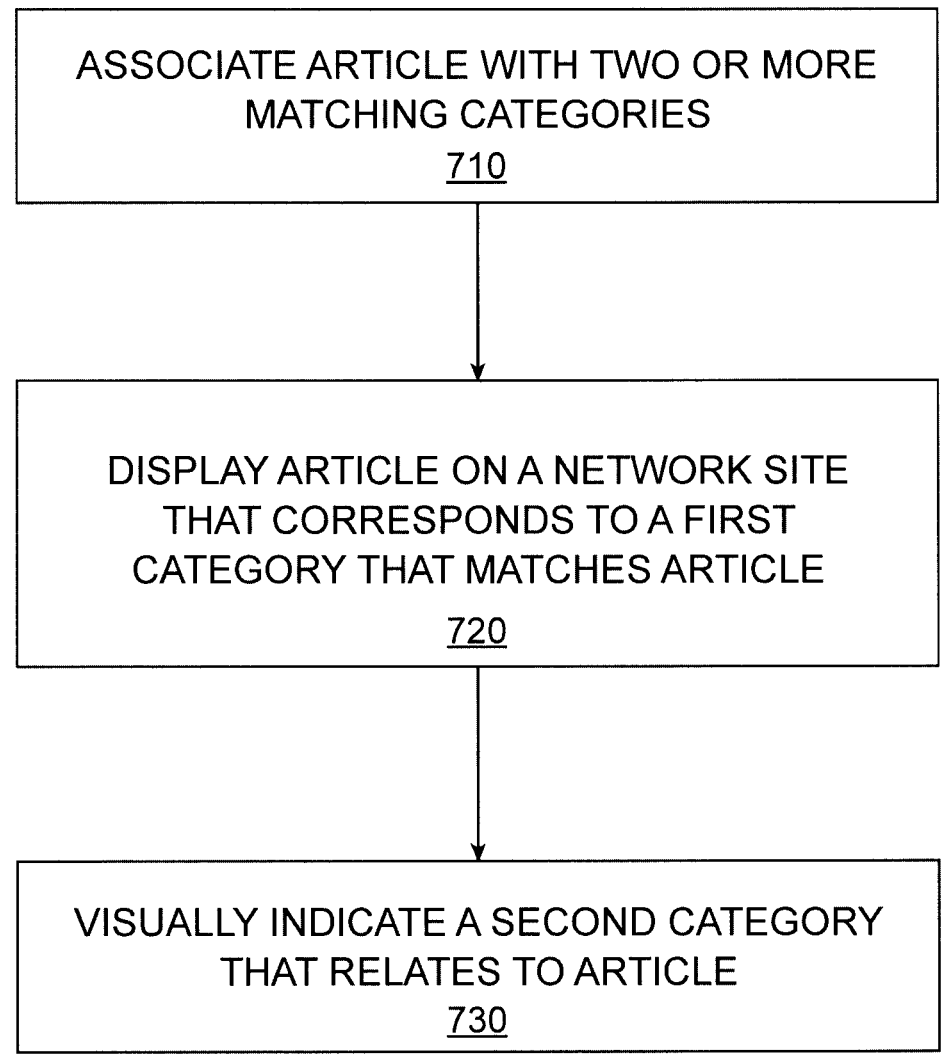
FIG. 7 illustrates a method in which content from a second category is suggested on a formatted page where content is aggregated and displayed for a first category.

In one embodiment, the suggested content is determined from the content of the item being viewed. FIG. 7 illustrates a method in which content from a second category is suggested on a formatted page where content is aggregated and displayed for a first category. In step 710, a categorization process is performed on an article (or other content item) where two or more matching nodes are identified and associated with the article (see description accompanying FIG. 5).

Step 720 provides that the article is displayed on a network site dedicated or otherwise associated with one of the categories identified for that article. With reference to an embodiment such as described in FIG. 6, the content may be displayed on a formatted page 640, belonging to a first category.

Step 730 provides that one or more visual indications (such as hyperlinks) are provided of a suggested category matching a second matching node for the displayed article. In the case where hyperlinks are used, the links may be to network sites where content is aggregated for the suggested category. As an alternative, the suggested content may yield an advertisement link, or display advertisement information.

An embodiment such as described in FIG. 7 can be implemented through use of categorization and display processes described with previous embodiments. Specifically, the ability to identify categories through processes such as described in FIG. 5 enables the determination of second categories. When content items are displayed on, for example, a given page of a category, display process 630 (see FIG. 6) may provide the visual indication of the second category or categories. The visual indication may be in the form of a link, summary, suggested heading, advertisement, or other data structure.

Formatted Pages

Figures 8, 9:
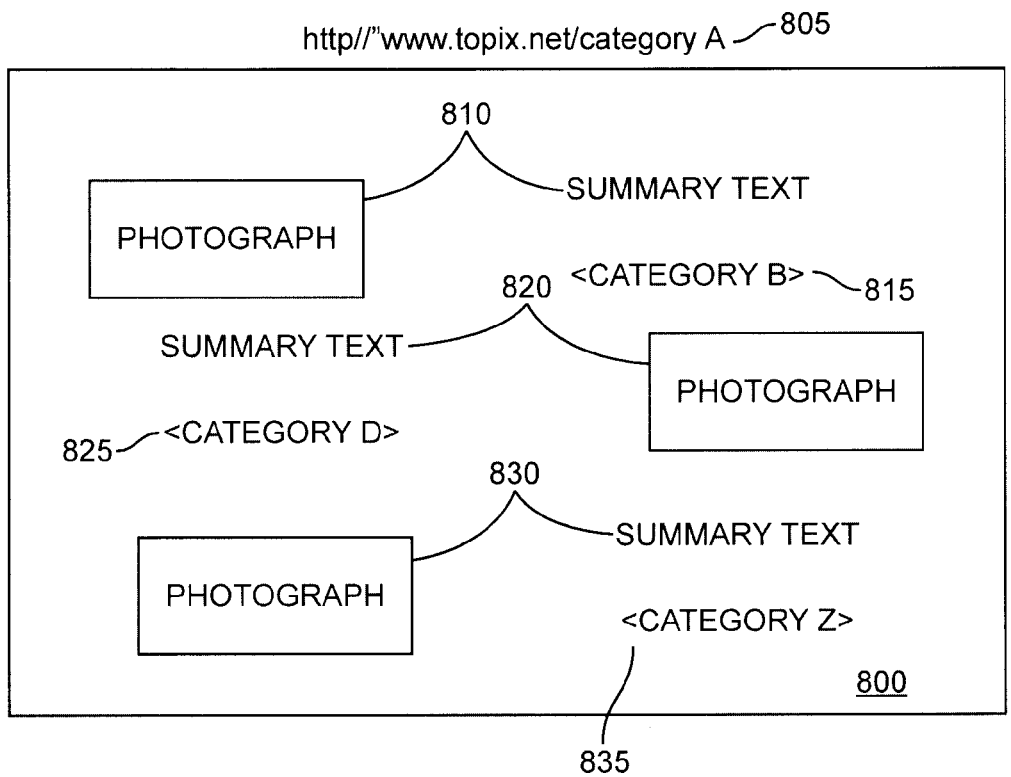
FIG. 8 illustrates a formatted page for displaying content that is derived from categorized content items, according to an embodiment.
FIG. 9 displays a formatted page, according to another embodiment.

FIG. 8 illustrates a formatted page 800 for displaying content that is derived from categorized content items, according to one embodiment. A formatted page may correspond to an output from embodiments described above, such as formatted page 640 described in FIG. 6. In addition, an embodiment described with FIG. 8 assumes that content is derived from articles categories through processes and methods described in previous embodiments.

With reference to FIG. 8, a first content item 810 corresponds to a segment of an article. The article may originate from a first network site. Included in the first content item 810 is an image 812, and text section 814. Selection of a heading or other link may display all of the text provided by the original article that appeared at the first network site. The image 812 may be stored from the article that was the source of the content item. In one embodiment, the text segment 814 includes the headline, sub-headline, and first few sentences of the text portion of the original article. A first link 815 may be provided to a second page for another category. The other category may be identified from the text of first content item 810.

Similarly, page 800 may also display second content item 820 and third content item 830. Second content item 820 may include second link 825 to a category identified by a categorization process performed on the text content of that item. Likewise, third content item 830 may include third link 835 to a third category identified by a categorization process performed on the text content of that item.

In an embodiment such as shown, formatted network page 800 has a uniform resource locator (URL) 805 or other address that is indicative of the category of that page. For example, page 800 may be assigned to "category A", and the content items 810-830 are selected by being pertinent to that category. A portion of the URL 805 also includes the term "category A".

FIG. 9 displays a formatted page 900 according to another embodiment. In FIG. 9, a page of a given category (or set of categories) is segmented, and each segment provides content through a different set of aggregation, edit and/or display rules.

In an example provided, formatted page 900 is provided with four columns. The page itself may be associated with a particular category, and a URL 905 to the page may indicate that category. A title of the category for the formatted page 902 may be provided in a prominent position. One or more of the columns display content from content items that were categorized and aggregated. In an example shown, a first primary column 910 displays category specific content, identified through a categorization process such as described above. A second primary column displays content that may be category specific for that category (or of another category), or non-category specific (e.g. top news). A left column 930 may display advertisement links, and a right column displays category links 940, although either left or right column may display advertisement, category or combinations of links. The links, as well as any other content appearing on the left or right column 930, 940 may be category specific as well, or independent of any categorization process.

In one embodiment, different display configurations and/or rules are used to display content on at least two of the columns. For example, first primary column 910 may display news of a first category (e.g. local news), and second primary column 920 may display news of a second category (e.g. national and world news). One of the columns may be refreshed using an automated categorization process, such as described above. For example, a system such as described in FIG. 1 may be used to identify, aggregate and select content for that column. In addition, first primary column 910 and second primary column 920 may refresh at different rates, or have different display rules. In one application, important news such as world headlines ("Big News") appears on the second primary column 920, while specific or categorized content appears on the first primary column 910. The Big News may be more important, and require less updating, as such news has long news cycles. On the other hand, category specific news may be refreshed more quickly, so that repeat visits to the page 900 is more likely to ensure fresh content for the viewer.

One manner in which the category specific web-pages may be provided to a user is through use of a search function. The search function may act as a prompt. A user may enter a search term, such as for example, a celebrity name, or the name of a disease. The search term may correspond to a web page displaying category-specific content. The search result may be the formatted web-page corresponding to the search result. That page may display updated content that is specific to the category of the search term.

Search Specific Categories

Figure 10:
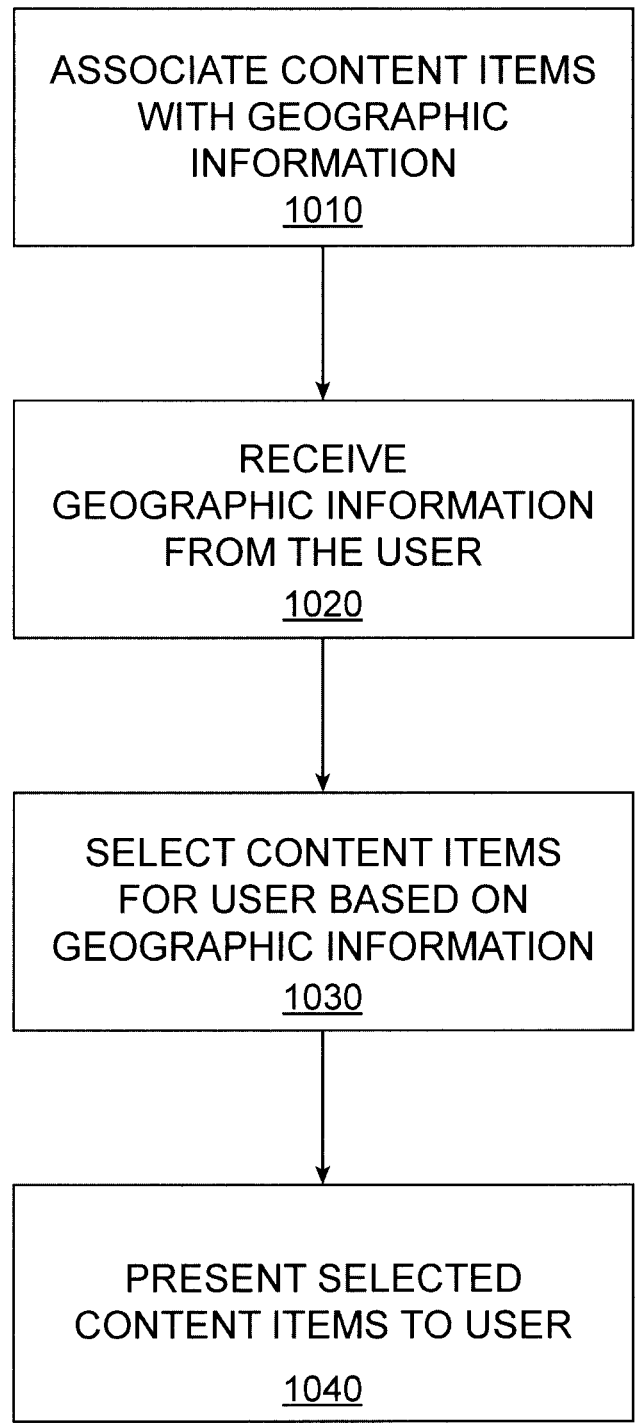
FIG. 10 illustrates a method for categorizing content based on geographic information, under an embodiment of the invention.

In an embodiment, categories may be generated, or re-configured from existing categories, based on information entered by or determined from a user. FIG. 10 illustrates an embodiment in which a category page of content items may be generated or configured based on such information. One specific type of information that may be used to generate such a page is geographic location specified by the user. For example, a user may utilize a service such as described in FIG. 10 to research or review content (e.g. local news) about the user's home destination, or an intended vacation destination.

In step 1010, content items located by crawler 110 are associated with geographic information. This step may be done on an ongoing basis with the aggregation of the content items. The search information may be selected so as to enable subsequent retrieval of content items responsive to user information that matches the search information. Examples of geographic information that can be stored for each content item include longitude, latitude, and/or zip code. The content items may be scanned for geographic information, using techniques such as described above, in order to associate the content items with a specific geographic information item.

For example, a location of a source of the content item and/or of the subject of the content item may be identified and associated with that content item.

In step 1020, geographic information for use in a search is received from the user. In the example provided above, the information may correspond to known geographic or location information about the user. For example, the user may enter his zip code, or exhibit actions indicating the user's geographic location. The geographic information may correspond to the longitude, latitude, street address, city or zip code of the user. The information may be determined from the user, either directly or indirectly. For example, the user's terminal may include cookies that identify the user's zip code or location. Alternatively, the information may be entered by the user as input, such as through a search interface.

In step 1030, content items are selected for the user based on the geographic information specified by the user. While embodiments described above provide for displaying categories to the user based on the search term, another embodiment may provide for reconfiguring one or more categories that match the search result to be location specific. Still further, embodiment provides for identifying on-the-fly a set of content items based on the geographic information specified by the user.

Responsive to receiving the geographic information item, step 1040 provides that the selected content items are presented to the user. In one embodiment, selected content items are sorted by an approximate distance from the user. For example, for cases when content items correspond to news, news stories in the user's town are prominently displayed, while news stories in an adjacent metropolis or the user's state or less prominently displayed. Still further, the order in which the news stories are presented to the user may be based on a distance of the geographic location stored with the particular news story and the location detected for the user.

To provide an example of an embodiment such as described in FIG. 10, user-input, past online activities (as tracked by cookies or other data) may be used to determine a location of the user. The location may be determined as longitude and latitude. When the user enters geographic input, content items are identified that match the user's location. This may include content items that are determined to be sufficiently proximate to the user (e.g. within 50 miles or in the same county). These content items are then included or otherwise provided for in a page or presentation displayed to the user.

As another example, the user may enter a zip code corresponding to his suburb. In this example, content items may be selected which match the zip code, and which match surrounding suburbs as well as the major metropolis of the locality. The page presented to the user may be configured to show the news stories (or other content items) of that person's specific suburb first. The remainder of the selected content items may be presented based on a distance of the subject or location of the content item from the user. For example, news stories of adjacent and/or most proximate suburbs may be displayed first, followed by the metropolis region, which may be further away than the surrounding suburbs. Thus the order of presentation for a list of content items provided on a page may be determined by the distance of the locations of those content items (e.g. subject or location of news story) from the known location of the user.

Conclusion

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What we claim is:

1. A system for aggregating content on a network, the system comprising:
   one or more processors to provide:
   a categorization process that is configured to (i) analyze a text content of each of a plurality of content items that are provided at a plurality of network sites, (ii) determine one or more categories that are to be associated with each of the plurality of content items, (iii) associate each of one or more of the plurality of categories with multiple content items;
   a selection process that is configured to identify a selection of some of the multiple content items that are associated with at least some of the plurality of categories; and
   a display process that is configured to generate a web page for each of the plurality of categories, the web page of each of the plurality of categories including at least a portion of each of multiple content items that are associated with that category by the categorization process, wherein for the web page of each of the plurality of categories, the portion of each of the multiple content items corresponds to (i) one of a phrase, sentence, or summary of that content item, and (ii) a link to a source for that phrase, sentence or summary.

2. The system of claim 1, wherein the link is provided in the phrase, sentence or summary of that content item.

3. The system of claim 1, wherein the display process identifies the source as a news aggregation web page.

4. The system of claim 1, wherein the display process displays the phrase, sentence, or summary of individual contents in a separate segment of the web page.

5. The system of claim 4, wherein the display process formats each web page according to one or more editorial rules.

6. The system of claim 5, wherein the display process selects an image for one or more items displayed on one or more of the web pages, and wherein the image is selected or formatted for display based on the one or more editorial rules.

7. The system of claim 4, wherein the categorization process is configured to determine one or more categories that are to be associated with each of the plurality of content items, wherein the one or more categories include anyone of a plurality of categories that for which at least some of individually correspond to a geographic location.

8. The system of claim 4, wherein the categorization process is configured to determine one or more categories that are to be associated with each of the plurality of content items, wherein the one or more categories include anyone of a plurality of categories that for which at least some of individually correspond to a name of a person or a place.

9. The system of claim 4, wherein the categorization process is configured to determine one or more categories that are to be associated with each of the plurality of content items, wherein the one or more categories include any one of a plurality of categories that for which at least some of individually correspond to a current event topic.

10. A non-transitory computer-readable medium that stores instructions that, when executed by one or more processors, causes the one or more processors to:
   using the one or more processors to perform steps comprising:
   analyzing a text content of each of a plurality of content items that are provided at a plurality of network sites;

determining one or more categories that are to be associated with each of the plurality of content items;
associating each of one or more of the plurality of categories with multiple content items;
identifying a selection of some of the multiple content items that are associated with at least some of the plurality of categories; and
generating a web page for each of the plurality of categories, the web page of each of the plurality of categories including at least a portion of each of multiple content items that are associated with that category, wherein for the web page of each of the plurality of categories, the portion of each of the multiple content items corresponds to (i) one of a phrase, sentence, or summary of that content item, and (ii) a link to a source for that phrase, sentence or summary.

11. The computer-readable medium of claim 10, wherein the link is provided in the phrase, sentence or summary of that content item.

12. The computer-readable medium of claim 10, wherein the computer-readable medium further stores instructions to cause the one or more processors to identify the source as a news aggregation web page.

13. The computer-readable medium of claim 10, wherein the computer-readable medium further stores instructions to cause the one or more processors to display the phrase, sentence, or summary of individual contents in a separate segment of the web page.

14. The computer-readable medium of claim 13, wherein the computer-readable medium further stores instructions to cause the one or more processors to format each web page according to one or more editorial rules.

15. The computer-readable medium of claim 14, wherein the computer-readable medium further stores instructions to cause the one or more processors to select an image for one or more items displayed on one or more of the web pages, and wherein the image is selected or formatted for display based on the one or more editorial rules.

16. The computer-readable medium of claim 13, wherein the computer-readable medium further stores instructions to cause the one or more processors to determine one or more categories that are to be associated with each of the plurality of content items, wherein the one or more categories include anyone of a plurality of categories that for which at least some of individually correspond to a geographic location.

17. The computer-readable medium of claim 13, wherein the computer-readable medium further stores instructions to cause the one or more processors to determine one or more categories that are to be associated with each of the plurality of content items, wherein the one or more categories include anyone of a plurality of categories that for which at least some of individually correspond to a name of a person or a place.

18. The computer-readable medium of claim 13, wherein the computer-readable medium further stores instructions to cause the one or more processors to determine one or more categories that are to be associated with each of the plurality of content items, wherein the one or more categories include any one of a plurality of categories that for which at least some of individually correspond to a current event topic.

19. A computer-implemented method for generating a web page, the method being implemented by one or more processors and comprising:
using the one or more processors to perform steps comprising:
analyzing a text content of each of a plurality of content items that are provided at a plurality of network sites;
determining one or more categories that are to be associated with each of the plurality of content items;
associating each of one or more of the plurality of categories with multiple content items;
identifying a selection of some of the multiple content items that are associated with at least some of the plurality of categories; and
generating a web page for each of the plurality of categories, the web page of each of the plurality of categories including at least a portion of each of multiple content items that are associated with that category, wherein for the web page of each of the plurality of categories, the portion of each of the multiple content items corresponds to (i) one of a phrase, sentence, or summary of that content item, and (ii) a link to a source for that phrase, sentence or summary.

20. The method of claim 19, wherein the link is provided in the phrase, sentence or summary of that content item.

* * * * *